Patented Oct. 25, 1938

2,134,015

UNITED STATES PATENT OFFICE 2,134,015

THIAZOLE COMPOUNDS

Robert R. Williams, Roselle, N. J., assignor to Research Corporation, New York, N. Y., a corporation of New York No Drawing. Application December 23, 1936, Serial No. 117,418

3 Claims. (Cl. 260—302)

This invention relates to the production of thiazole compounds, more particularly those which are useful in the synthesis of compounds related to the antineuritic vitamin, generally known as vitamin $B_1$.

Vitamin $B_1$ and related compounds having similar physiological properties are useful in the treatment of diseases, notably beriberi, and aid in the maintenance and well being, and in the growth of animals including man. A number of research workers have been endeavoring to produce synthetic compounds which are identical with or closely related to the natural antineuritic vitamin and which have physiological properties comparable to those of this vitamin. Among the compounds which have proven to be useful in syntheses of this nature are the thiazole derivative designated 4-methyl-5-$\beta$-hydroxy-ethyl-thiazole and salts thereof.

The object of the present invention is to provide thiazole compounds suitable for the synthetic production of compounds related to the antineuritic vitamin.

In accordance with the invention, a salt of vitamin $B_1$ is caused to react with a water solution of a soluble sulphite and the resulting thiazole derivative is separated from the reaction mixture and purified.

A specific method by which thiazole compounds embodying the invention may be produced is as follows:

One gram of vitamin $B_1$ chloride hydrochloride and 2 grams of sodium sulphite are disssolved in 15 cc. of water, sulphurous acid is added till the pH is about 5 and the solution is allowed to stand at room temperature for 48 hours. It is then filtered from any material, chiefly 2-methyl-6-amino-pyrimidine-5-methyl-sulphonic acid, which has crystallized out.

The filtrate is made slightly alkaline with an alkali hydroxide, such as sodium hydroxide, and extracted repeatedly with chloroform. Ether or a similar solvent may be used in place of chloroform if desired. The chloroform extract is dried over sodium carbonate and evaporated to dryness leaving an oily residue of faint basic odor analyzing for the composition $C_6H_9NSO$. This substance consists of the free thiazole derivative base, 4-methyl-5-$\beta$-hydroxy-ethyl-thiazole, in a substantially pure state. This compound has the structural formula

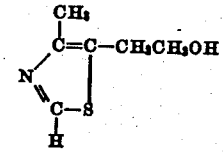

The yield is about 400 milligrams or nearly the theoretical. On cautious oxidation with nitric acid the base yields 4-methyl-thiazole-5-carboxylic acid (Annalen 259, 299, (1890). On treatment with strong hydrochloric acid the base yields 4-methyl-5-$\beta$-chlor-ethyl-thiazole.

The thiazole base produced by the foregoing method reacts readily with the common acids to form salts. The acids add directly on to the nitrogen atom of the base to form salts in which the nitrogen is pentavalent, and which have the structural formula:

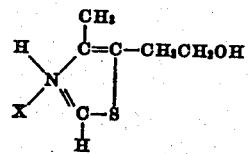

in which X represents an anion, for example, an acid radical, such as $HSO_4$, or an elementary anion, such as the chloride ion. By way of example, the substance may be converted into its hydrochloride by dissolving it in dilute hydrochloric acid and evaporating the solution to dryness. The resulting hydrochloride may be purified by dissolving in a minimum amount of absolute alcohol and adding dioxane which causes the hydrochloride to separate upon standing for several hours in the form of colorless crystals.

An aqueous solution of the hydrochloride on treatment with a solution of picrolonic acid in methanol precipitates a crystalline picrolonate which melts with decomposition at 184° C. When an ether solution of picric acid is added to an ether solution of the free base a crystalline picrate is obtained which melts at 162°-163° C.

The vitamin $B_1$ chloride hydrochloride employed in the above described method is described in an article by R. R. Williams et al., Journal of American Chemical Society, vol. 56, p. 1187 (1934) and vol. 57, p. 517 (1935). Instead of the chloride hydrochloride of vitamin B₁ other salts thereof, such as the corresponding bromine compound, may be employed. Also other soluble sulphites may be used instead of sodium sulphite. For example, ammonium or potassium sulphite may be used with satisfactory results.

The 4-methyl-5-β-hydroxy-ethyl-thiazole and its salts which are embraced within this invention may be caused to react with pyrimidine derivatives allied to that forming a part of the structure of vitamin B₁ to produce compounds having antineuritic properties. For example, this thiazole, or a salt thereof, such as the hydrobromide, may be caused to react with the compound 2-methyl-6-amino-5-bromomethyl pyrimidine, or a salt thereof, such as the hydrobromide, to produce the bromide hydrobromide of vitamin B₁. A synthesis of the above nature is revealed in the article entitled "Synthesis of vitamin B₁" which I published in conjunction with Dr. J. K. Cline in the Journal of the American Chemical Society, 58, 1504 (1936).

What is claimed is:

1. Thiazole compounds of the group consisting of:

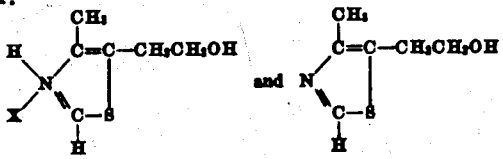

in which X represents an anion.

2. The thiazole derivative having the formula:

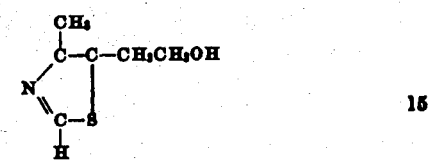

3. Thiazole salts having the formula:

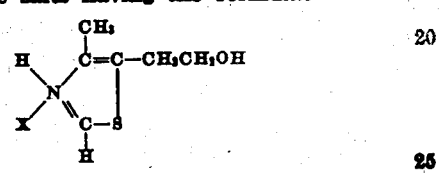

in which X is an anion.

ROBERT R. WILLIAMS.